(12) United States Patent
Rasimas et al.

(10) Patent No.: US 7,461,165 B1
(45) Date of Patent: Dec. 2, 2008

(54) APPARATUS FOR DISTINCTIVE LABEL EDGE DEMARCATION FOR MULTIPROTOCOL LABEL SWITCHING

(75) Inventors: Jennifer G. Rasimas, Morrisville, NC (US); Stephen S. Jackson, Chapel Hill, NC (US); Ottis K. Black, Raleigh, NC (US)

(73) Assignee: Nortel Networks Limited, St. Laurent, Quebec (CA)

( * ) Notice: Subject to any disclaimer, the term of this patent is extended or adjusted under 35 U.S.C. 154(b) by 555 days.

(21) Appl. No.: 09/954,406

(22) Filed: Sep. 17, 2001

(51) Int. Cl.
*G06F 15/173* (2006.01)
*G06F 15/177* (2006.01)
*G06F 15/16* (2006.01)
*G06F 3/00* (2006.01)

(52) U.S. Cl. .................... 709/238; 709/220; 709/223; 709/230; 710/11

(58) Field of Classification Search ............ 710/11; 370/360
See application file for complete search history.

(56) References Cited

U.S. PATENT DOCUMENTS 6,628,649 B1 * 9/2003 Raj et al. ............... 370/360
7,068,597 B1 * 6/2006 Fijolek et al. ........... 370/230

* cited by examiner

*Primary Examiner*—Alan Chen
(74) *Attorney, Agent, or Firm*—Anderson Gorecki & Manaras LLP

(57) ABSTRACT

A "thin" label switching device implements label edge functionality but not label switching functionality. By implementing only the label edge functionality but not the label switching functionality, the "thin" label switching device is less complex and less expensive than a fully functioning label switching device.

9 Claims, 4 Drawing Sheets

APPARATUS FOR DISTINCTIVE LABEL EDGE DEMARCATION FOR MULTIPROTOCOL LABEL SWITCHING

CROSS-REFERENCE TO RELATED APPLICATION(S)

The present application may be related to the following commonly owned United States patent application, which is hereby incorporated herein by reference in its entirety:

U.S. patent application Ser. No. 09/707,082 entitled SYSTEM, DEVICE, AND METHOD FOR CONFIGURING A DEVICE, filed on Nov. 6, 2000 in the names of Stephen S. Jackson and Franco Travostino.

FIELD OF THE INVENTION

The present invention relates generally to multiprotocol label switching (MPLS), and more particularly to an apparatus implementing label edge router functionality but not label switching router functionality.

BACKGROUND OF THE INVENTION

In today's information age, communication devices, such as computers and computer peripherals, are often internetworked over a communication network. A common networking model routes packets of information within the communication network using a networking protocol such as the Internet Protocol (IP) or other network layer protocol. Some networking protocols, such as IP, are considered to be "connectionless" networking protocols. In a connectionless networking protocol, each packet of information includes a network layer address, and each router forwards the packet of information based upon the network layer address according to predetermined signaling and routing protocols, such as the Open Shortest Path First (OSPF) protocol, the Routing Information Protocol (RIP), Hello, Border Gateway Protocol (BGP), RSVP, or other routing protocol.

Thus, each router makes an independent forwarding decision for the packet based upon the network layer address. Essentially, each router partitions the entire set of network layer addresses into a number of Forwarding Equivalence Classes (FECs), and each FEC is mapped to a particular outgoing path (or set of paths, in the case of multi-path routing) based upon the routing protocol. The router determines an FEC for each packet of information based upon the network layer address of the packet, and forwards the packet of information to the corresponding outgoing path (or set of paths).

Network layer routing requires each router to process each packet of information at the network layer. This is an expensive and time-consuming operation that limits the performance of some routers and even prevents certain devices that do not support the networking protocol from performing routing and other functions on the packets.

Label switching can be used to eliminate the network layer processing by certain devices in the communication network. Label switching enables a packet to be transported across a network domain (referred to hereinafter as an "autonomous system" or "AS") using labels rather than the network layer address. Specifically, a label switched path (LSP) is established from an ingress point border device to an egress point border device in the AS. The LSP traverses a number of intermediate label switching devices. When the packet enters the ingress point border device, the ingress point border device uses the network address to assign the packet to a particular FEC, and inserts the corresponding label into the packet, specifically within a label header. Each intermediate label switching device along the LSP forwards the packet based upon the label. The egress point border device removes the label from the packet and forwards the packet based upon the network address. Thus, only the border devices process the packet at the network layer, while the intermediate devices process the packet based upon the label only.

In order to establish and remove LSPs, the various label switching devices exchange label switching information using a signaling protocol. Label switching information can be exchanged using a dedicated label distribution protocol, or can be exchanged ("piggy-backed") in other signaling and routing protocols, such as OSPF, IS-IS, and RIP.

Each label switching device maintains mapping information for mapping each FEC to a corresponding label. The label mapping information is typically maintained in the various forwarding/routing tables maintained by the label switching device. It is common for the label switching device to maintain a forwarding table for each incoming interface and a forwarding table for each outgoing interface. The label mapping information maintained by the label switching device in the incoming forwarding tables enables the label switching device to quickly forward received packets that include label switching information. The label mapping information maintained by the label switching device in the outgoing forwarding tables enables the label switching device to insert label switching information into packets. For convenience, a forwarding table that includes label mapping information may be referred to as a label information base (LIB).

An architecture for multi-protocol label switching (MPLS) is discussed in E. Rosen et. al., Multiprotocol Label Switching Architecture, Internet Engineering Task Force (IETF) Request For Comments (RFC) 3031, January 2001, which is hereby incorporated herein by reference in its entirety. One signaling protocol for exchanging label switching information for MPLS is commonly known as the Label Distribution Protocol (LDP). LDP is described in L. Andersson et. al., LDP Specification, Internet Engineering Task Force (IETF) Request For Comments (RFC) 3036, January 2001, which is hereby incorporated herein by reference in its entirety. An encoding technique for producing and processing labeled packets for MPLS is described in E. Rosen et. al., MPLS Label Stack Encoding, Internet Engineering Task Force (IETF) Request For Comments (RFC) 3032, January 2001, which is hereby incorporated herein by reference in its entirety.

A typical label switching device includes both label edge and label switching functionality. The label edge functionality enables the label switching device to function at the edge of a MPLS network, where labels are added to and removed from packets. The label switching functionality enables the label switching device to function within the MPLS network, where packets are forwarded based upon labels. Each label switching device is configured to perform either the label edge functionality or the label switching functionality based upon the location of the label switching device in the MPLS network.

SUMMARY OF THE INVENTION

In accordance with one aspect of the invention, a "thin" label switching device implements label edge functionality but not label switching functionality. By implementing only the label edge functionality but not the label switching functionality, the "thin" label switching device is less complex and less expensive than a fully functioning label switching device.

In accordance with another aspect of the invention, the "thin" label switching device includes an outside interface, label edge logic, and one or more inside interface(s). Information received over an inside interface having an inside destination is routed by the label edge logic to the inside destination over an appropriate inside interface. Information received over an inside interface having an outside destination is labeled by the label edge logic and forwarded by the label edge logic over the outside interface, and, in particular, over a pre-established LSP. Label switched information received over the outside interface having an inside destination is stripped of its label by the label edge logic and routed by the label edge logic to the inside destination over an appropriate inside interface. The label edge logic can also send various management and control information generated by the "thin" label switching device over a LSP, for example, to a management or accounting system.

DETAILED DESCRIPTION OF A PREFERRED EMBODIMENT

As described above, a typical label switching device includes both label edge and label switching functionality. The label edge functionality enables the label switching device to function at the edge of a MPLS network, where labels are added to and removed from packets. The label switching functionality enables the label switching device to function within the MPLS network, where packets are forwarded based upon labels. Each label switching device is configured to perform either the label edge functionality or the label switching functionality based upon the location of the label switching device in the MPLS network.

Figure 1:
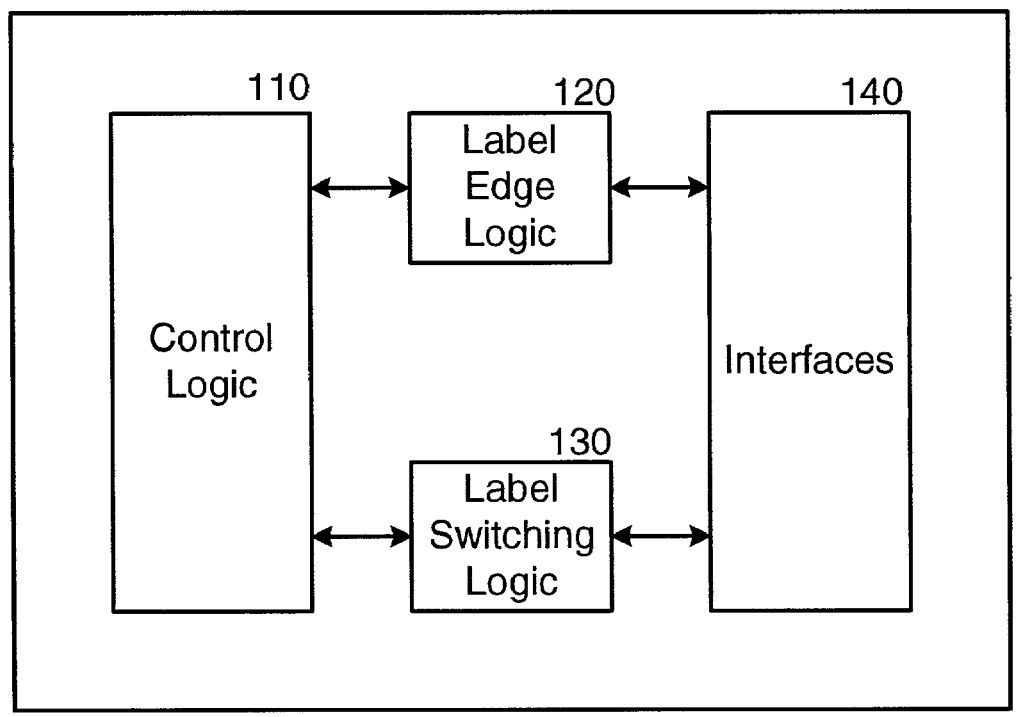
FIG. 1 is a block diagram showing the relevant components of a label switching device as known in the art.

FIG. 1 is a block diagram showing the relevant components of a label switching device 100 as known in the art. Among other things, the label switching device 100 includes control logic 110, label edge logic 120, label switching logic 130, and interfaces 140. The control logic 110 selects between label edge functionality, in which the label edge logic 120 is activated, or label switching functionality, in which the label switching logic 130 is activated. Information received over the interfaces 140 is processed by either the label edge logic 120 or the label switching logic 130 accordingly.

Unfortunately, a label switching device having both label edge functionality and label switching functionality is not appropriate for certain applications, such as home and small business applications, due to cost and security concerns. Therefore, in an embodiment of the present invention, a "thin" label switching device implements label edge functionality but not label switching functionality. By implementing only the label edge functionality but not the label switching functionality, the "thin" label switching device is less complex and less expensive than a fully functioning label switching device.

The "thin" label switching device is typically used in applications where cost and complexity are important, for example, for interfacing a home or business to a MPLS network. In such applications, label switching is typically only required on the "outside" interface (i.e., the interface to the MPLS network) and not on "inside" interfaces (i.e., interfaces within the home or business).

Figure 2:
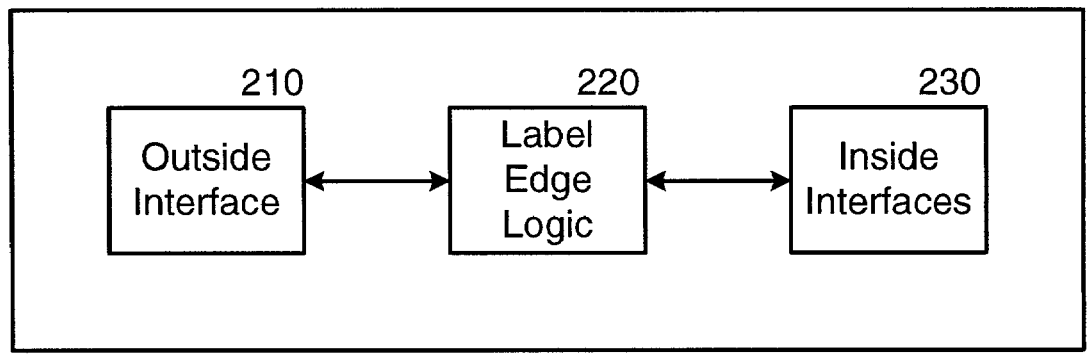
FIG. 2 is a block diagram showing the relevant components of an exemplary "thin" label switching device in accordance with an embodiment of the present invention.

FIG. 2 is a block diagram showing the relevant components of an exemplary "thin" label switching device 200 in accordance with an embodiment of the present invention. Among other things, the "thin" label switching device 200 includes an outside interface 210, label edge logic 220, and one or more inside interface(s) 230. Information received over an inside interface 230 having an inside destination is routed by the label edge logic 220 to the inside destination over an appropriate inside interface 230. Information received over an inside interface 230 having an outside destination is labeled by the label edge logic 220 and forwarded by the label edge logic 220 over the outside interface 210, and, in particular, over a pre-established LSP. Label switched information received over the outside interface 210 having an inside destination is stripped of its label by the label edge logic 220 and routed by the label edge logic 220 to the inside destination over an appropriate inside interface 230. The label edge logic 220 can also send various management and control information generated by the "thin" label switching device over a LSP, for example, to a management or accounting system.

In one exemplary embodiment of the present invention, the "thin" label switching functionality is incorporated into a data appliance gateway (DAG), as described in the related application entitled SYSTEM, DEVICE, AND METHOD FOR CONFIGURING A DEVICE incorporated by reference above. This enables the DAG to interface to a MPLS network for sending and receiving information over the MPLS network, thereby providing secure broadband connectivity into the home or business in a cost-effective manner.

Figure 3:
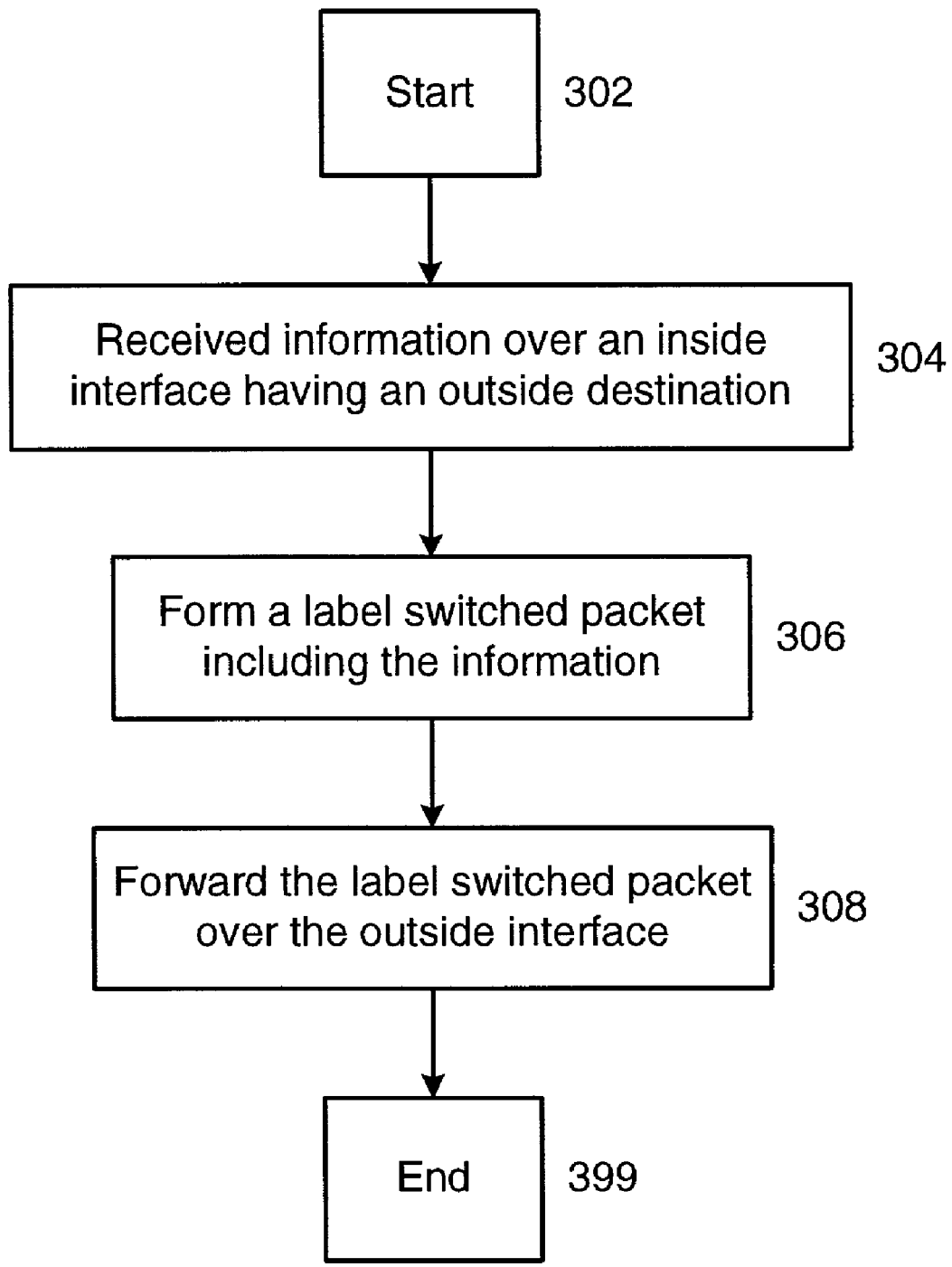
FIG. 3 is a logic flow diagram showing exemplary "thin" label switching logic for forwarding information from an inside interface to the outside interface.

FIG. 3 is a logic flow diagram showing exemplary "thin" label switching logic 300 for forwarding information from an inside interface to the outside interface. Beginning in block 302, the logic receives information over an inside interface having an outside destination, in block 304. The logic forms a label switched packet including the information, in block 306. The logic forwards the label switched packet over the outside interface, in block 308. The logic 300 terminates in block 399.

Figure 4:
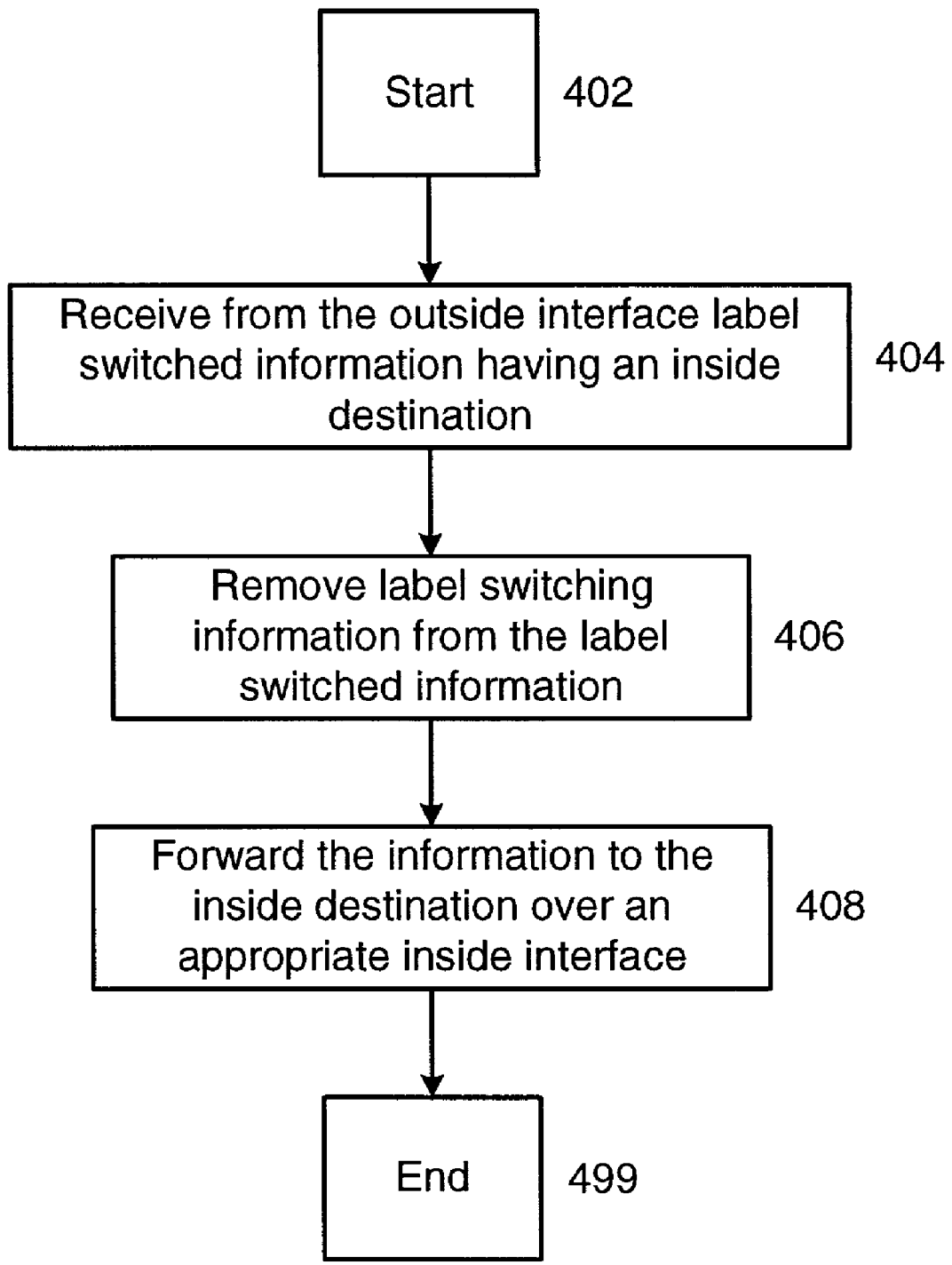
FIG. 4 is a logic flow diagram showing exemplary "thin" label switching logic for forwarding information from the outside interface to an inside interface.

FIG. 4 is a logic flow diagram showing exemplary "thin" label switching logic 400 for forwarding information from the outside interface to an inside interface. Beginning in block 402, the logic receives from the outside information label switched information having an inside destination, in block 404. The logic removes label switching information from the label switched information, in block 406. The logic forwards the information to the inside destination over an appropriate inside interface, in block 408. The logic 400 terminates in block 499.

It should be noted that the term "router" is used herein to describe a communication device that may be used in a communication system, and should not be construed to limit the present invention to any particular communication device type. Thus, a communication device may include, without limitation, a bridge, router, bridge-router (brouter), switch, node, or other communication device.

It should also be noted that the term "packet" is used herein to describe a communication message that may be used by a communication device (e.g., created, transmitted, received, stored, or processed by the communication device) or conveyed by a communication medium, and should not be construed to limit the present invention to any particular communication message type, communication message format, or communication protocol. Thus, a communication message may include, without limitation, a frame, packet, datagram, user datagram, cell, or other type of communication message.

It should also be noted that the logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the described logic is implemented as a set of computer program instructions that is converted into a computer executable form, stored as such in a computer readable medium, and executed by a microprocessor within the "thin" label switching device under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

What is claimed is:

1. Communications network apparatus comprising:
   a non-label switched user network including a first terminal device;
   a multiprotocol label switching network including a second communications device having label switching logic; and
   a gateway connected between the user network and the multiprotocol label switching network by only a single label switched path, the gateway including a plurality of user interfaces for coupling the gateway to appliances in the user network; only one multiprotocol label switching interface for coupling the gateway to the multiprotocol label switching network via the single label switched path; and multiprotocol label logic including label edge logic but excluding label switching logic because only a single label switching interface and single label switched path are available, the multiprotocol label logic operably coupled between the user interface and the multiprotocol label switching interface for routing information between the user interface and the multiprotocol label switching interface, the label edge logic being operative to receive data from the first terminal device via the user interface, associate a label with the data, and transmit the labeled data via the label switching interface to the second communications device over a pre-established label switched path, the second communications device being operative to direct the data based on the label.

2. The apparatus of claim 1, wherein multiprotocol label logic is operably coupled to receive information over at least one of the user interfaces and forward the information in a label switched packet over the multiprotocol label switching interface.

3. The apparatus of claim 1, wherein the multiprotocol label logic is operably coupled to receive label switched information over the multiprotocol label switching interface and forward unlabeled information over at least one of the user interfaces.

4. The apparatus of claim 1, wherein the multiprotocol label logic is operably coupled to send management and control information over the multiprotocol label switching interface.

5. A communications network comprising:
 a non-label switched user segment including a first terminal device;
 a multiprotocol label switching segment including a second communications device having label switching logic; and
 a data appliance gateway having a user interface for coupling the gateway to the user segment; only one multiprotocol label switching interface for coupling the gateway to the multiprotocol label switching segment by only a single label switched path; and multiprotocol label logic including label edge logic but excluding label switching logic, the multiprotocol label logic operably coupled between the user interface and the multiprotocol label switching interface for routing information between the user interface and the multiprotocol label switching interface, the label edge logic being operative to receive data from the first terminal device via the user interface, associate a label with the data, and transmit the labeled data via the label switching interface to the second communications device over a pre-established label switched path, the second communications device being operative to direct the data based on the label.

6. The communications network of claim 5, wherein multiprotocol label logic is operably coupled to receive information over the user interface and forward the information in a label switched packet over the multiprotocol label switching interface.

7. The communications network of claim 5, wherein the multiprotocol label logic is operably coupled to receive label switched information over the multiprotocol label switching interface and forward unlabeled information over the user interface.

8. The communications network of claim 5, wherein the multiprotocol label logic is operably coupled to send management and control information over the multiprotocol label switching interface.

9. A thin multiprotocol label switching apparatus comprising:
 a user interface for coupling to a user network;
 only one multiprotocol label switching interface for coupling to a multiprotocol label switching network; and
 logic for implementing the label edge functionality portion of the Multiprotocol Label Switching Protocol, but not the label switching functionality portion of the Multiprotocol Label Switching Protocol, the logic operably coupled between the user interface and the multiprotocol label switching interface for routing information between the user interface and the multiprotocol label switching interface, the logic being operable detect an unknown device in the user network, establish communication with the unknown device, and configure the unknown device based upon predetermined management capabilities of the device.

* * * * *